(12) United States Patent
Wei et al.

(10) Patent No.: US 8,934,764 B2
(45) Date of Patent: Jan. 13, 2015

(54) ELECTRICAL HEATING DEVICE AND EQUIPMENT WITH PLUGGABLE HEATING MODULE

(71) Applicants: Chih-Chang Wei, New Taipei (TW); Etsuro Habata, New Taipei (TW)

(72) Inventors: Chih-Chang Wei, New Taipei (TW); Etsuro Habata, New Taipei (TW)

(73) Assignee: Betacera Inc., New Taipei (TW)

( * ) Notice: Subject to any disclaimer, the term of this patent is extended or adjusted under 35 U.S.C. 154(b) by 291 days.

(21) Appl. No.: 13/668,323

(22) Filed: Nov. 5, 2012

(65) Prior Publication Data

US 2014/0126896 A1    May 8, 2014

(51) Int. Cl.
*F24H 1/10*    (2006.01)
*B60H 1/22*    (2006.01)

(52) U.S. Cl.
CPC .................................. *B60H 1/2221* (2013.01)
USPC ............................. 392/494; 392/465; 392/485

(58) Field of Classification Search
None
See application file for complete search history.

(56) References Cited

U.S. PATENT DOCUMENTS

| | | | | |
|---|---|---|---|---|
| 4,104,509 A | * | 8/1978 | Van Bokestal et al. | 219/544 |
| 4,147,927 A | * | 4/1979 | Pirotte | 219/541 |
| 4,327,282 A | * | 4/1982 | Nauerth | 219/541 |
| 4,418,272 A | * | 11/1983 | Roller et al. | 219/541 |
| 4,426,573 A | * | 1/1984 | Fudickar et al. | 219/544 |
| 4,822,980 A | * | 4/1989 | Carbone et al. | 392/453 |
| 4,899,032 A | * | 2/1990 | Schwarzl et al. | 219/540 |
| 4,954,692 A | * | 9/1990 | Shikama et al. | 219/540 |
| 5,017,758 A | * | 5/1991 | Kirkman et al. | 219/205 |
| 5,192,853 A | * | 3/1993 | Yeh | 219/540 |
| 5,828,810 A | * | 10/1998 | Frank et al. | 392/502 |
| 5,889,260 A | * | 3/1999 | Golan et al. | 219/505 |
| 6,493,508 B1 | * | 12/2002 | Roesgen | 392/485 |
| 6,512,212 B1 | * | 1/2003 | Leverne Harris | 219/628 |
| 6,847,017 B2 | * | 1/2005 | Starck et al. | 219/534 |
| 6,909,843 B1 | * | 6/2005 | Fabrizio | 392/490 |
| 7,907,835 B2 | * | 3/2011 | Boussemart et al. | 392/479 |
| 7,977,610 B2 | * | 7/2011 | Hamburger et al. | 219/537 |
| 8,180,207 B2 | * | 5/2012 | Shirai et al. | 392/491 |
| 8,607,694 B2 | * | 12/2013 | Blanc et al. | 99/323.3 |
| 2011/0062137 A1 | * | 3/2011 | Wu | 219/202 |
| 2011/0280554 A1 | * | 11/2011 | Schlipf | 392/478 |
| 2012/0037009 A1 | * | 2/2012 | Blanc et al. | 99/302 R |

* cited by examiner

*Primary Examiner* — Thor Campbell
(74) *Attorney, Agent, or Firm* — Chun-Ming Shih; HDLS IPR Services (57) ABSTRACT

An electrical heating device with pluggable heating module includes a box body (10) and a heating module (20). The box body (10) has an accommodation space (14) for the liquid (74) contained therein, which is provided with a slot (111) communicating the accommodation space (14). The heating module (20) is received in the slot (111) in a pluggable way and separates the accommodation space into a first chamber (141) and a second chamber (142). The heating module (20) includes a positive temperature coefficient (PTC) heating component (21) and a heat conducting component (22) covering the outside of the PTC heating component (21). By this arrangement, the time for maintaining the electrical heating device (1) can be saved and the liquid (74) heating effect of the electrical heating device (1) can be improved as well.

15 Claims, 8 Drawing Sheets

ELECTRICAL HEATING DEVICE AND EQUIPMENT WITH PLUGGABLE HEATING MODULE

BACKGROUND

1. Technical Field

The present invention relates to an electrical heating equipment, especially to an electrical heating device with pluggable heating module.

2. Related Art

By the trend of energy saving and carbon emission reducing, the electric automobile will gradually replace the traditional one. The heat of the air conditioning of the traditional automobile is provided by the cooling water circulating the engine; however, the electric automobile can not be operated in the same way because the electric automobile is not driven by the engine. Therefore, an electrical heating device is developed to heat the circulating liquid for the air conditioning of the electric automobile.

The conventional electrical heating device includes a box body and a heating module. The box body is provided with an accommodating space, and one side of the box body is provided with a water inlet and a water outlet. The heating module connects and fixes at one side of the box body, and the liquid is filled in the accommodating space. When in use, the heat generated from the heating module will be conducted to the box body, and the heat exchange will take place between the inner wall of box body and the liquid of the accommodating space, thereby achieving the goal of heating the liquid.

However, the conventional electrical heating device has the following drawbacks. First, the heating module heats the liquid by transferring the heat to the box body, and the box body will further exchange the heat with the liquid. Since the heating process is indirectly, the heating effect is not good enough. Second, the heating module is directly fixed to one side of the box body. If the heating module is damaged or not working properly, the whole electrical heating device is always replaced since assembling/disassembling the components of the heating module is too complicated, which results in waste of the cost.

BRIEF SUMMARY

The present invention provides a pluggable heating module assembled with the box body, and the heating module can be replaced or repaired when the heating module is damaged or not working properly, thereby saving time for maintaining the electrical heating device.

The present invention also utilizes a heat conducting component of the heating module directly contacting and heating the liquid of the accommodation space to improve the liquid heating effect of the electrical heating device.

The present invention provides an electrical heating device having pluggable heating modules for heating liquid, which comprises a box body and a heating module. The box body has an accommodation space for accommodating the liquid, and the box body which is provided with a slot for communicating the accommodation space. The heating module is received in the slot in a pluggable way and separates the accommodation space into a first chamber and a second chamber. The heating module includes a positive temperature coefficient (PTC) heating component and a heat conducting component covering the outside of the PTC heating component.

The present invention provides another electrical heating device having pluggable heating modules, which comprises a liquid supply, a box body, and a heating module. The liquid supply includes a liquid, a water pump, a liquid inlet pipe and a liquid outlet pipe connecting to the water pump. The box body has an accommodation space for accommodating the liquid, the box body is provided with a slot, a water inlet and a water outlet communicating the accommodation space. The water inlet communicates with the liquid inlet pipe, and the water outlet communicates with the liquid outlet pipe. The heating module inserting into the slot in a pluggable way and separates the accommodation space into a first chamber and a second chamber, and the water inlet and the water outlet communicate the first chamber and the second chamber, respectively. The heating module includes a PTC heating component and a heat conducting component covering the outside of the PTC heating component.

The present invention has the advantages as follows. First, by the electric conductive feature of the heat conducting glue, the efficiency of the electricity conduction from each electrode plate to the PTC heating unit can be improved, and thus enhances the heat generating effect of the PTC heating unit. Besides, by the heat conduction feature of the heat conducting glue and the insulation heat conducting glue, the heat generated by the PTC heating unit can be conducted to the heat conducting component more efficiently, and the liquid heating effect of the electrical heating device can be better. Second, by the insulation feature of the insulation heat conducting glue and the insulation heat conducting plate, the electric leakage from each electrode plate to the heat conducting component can be prevented. Third, by utilizing the fluid passages formed in the first chamber and the second chamber by each convex rib of the upper cover plate and the lower cover plate, respectively, the flowing distance that the liquid flows into or flows out the first chamber and the second chamber can be increased. By doing so, the heating module has more heating time for the liquid, and the heating effect for heating the liquid by the electrical heating device can be improved as well.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Please refer to FIGS. 1 to 5. The present invention provides an electrical heating device 1 with pluggable heating module, which includes a box body 10 and a heating module 20.

The box body 10 includes a hollow proper 11, an upper cover plate 12, and a lower cover plate 13. The upper cover plate 12 covers one side of the hollow proper 11, and the lower cover plate 13 covers the other side of the hollow proper 11. An accommodation space 14 is formed by surrounding with the hollow proper 11, the upper cover plate 12, and the lower cover plate 13. One side of the hollow proper 11 is provided with a slot 111 communicating with the accommodation space 14, and the opposite side of the slot 111 of the hollow proper 11 is provided with a fixation trough 112. The heating module 20 is pluggable and inserted into the slot 111 of the hollow proper 11. The end away from the slot 111 of the heating module 20 is fixed inside the fixation trough 112 and separates a first chamber 141 and a second chamber 142 from the accommodation space 14. A side near the slot 111 of the hollow proper 11 is provided with a water inlet 113 and a water outlet 114. The water inlet 113 and the water outlet 114 are connected to the first chamber 141 and the second chamber 142 respectively. A side near the hollow proper 11 of the upper cover plate 12 is formed a plurality of convex ribs 121 which are against an outer surface near the first chamber 141 of a heat conducting component 22, thereby forming a fluid passage 1211 in the first chamber 141. A side near the hollow proper 11 of the lower cover plate 13 is formed a plurality of convex ribs 131 which are against an outer surface near the second chamber 142 of the heat conducting component 22, thereby forming a fluid passage 1311 in the second chamber 142. A waterproof gasket 30 is sandwiched between the upper cover plate 12 and the hollow proper 11, and the lower cover plate 13 and the hollow proper 11, respectively. The hollow proper 11, the upper cover plate 12, and the lower cover plate 13 are made of heat-resistant material, and the waterproof gasket 30 is made of silica gel or rubber.

The heating module 20 includes a PTC heating component 21 and the heat conducting component 22. The heat conducting component 22 covers the outside of the PTC heating component 21. The PTC heating component 21 includes at least a PTC heating unit 211, a pair of electrode plates 212, and a pair of insulation heat conducting plates 213. Each electrode plate 212 connects both sides of the PTC heating unit 211, respectively. One side of each insulation heat conducting plate 213 connects each electrode plate 212, respectively, and the other side of the heat conducting plate 213 connects the inner surface of the heat conducting component 22 respectively. One end of each electrode plate 212 near the slot 111 of the hollow proper 11 is provided with a first electric conductive terminal 2121. The PTC heating unit 211 is made of ceramic material which has positive temperature coefficient. The heat conducting component 22 is made of aluminum or aluminum alloy, and each insulation heat conducting plate 213 is made of alumina.

The electrical heating device and equipment 1 further includes a heat conducting glue 40, an insulation heat conducting glue 50, and a connector 60. Each insulation heat conducting plate 213 sticks to each electrode plate 212 by the insulation heat conducting glue 50. Each insulation heat conduction plate 213 sticks to the inner surface of the PTC heating component 22 by the insulation heat conducting glue 50. One side of the connector 60 inserted into the slot 111 and covers the outside of one end of the PTC heating component 21 near the slot 111, and electrically connects to the first electric conductive terminal 2121 of each electrode plate 212. The other side of the connector 60 is provided with a second electric conductive terminal 61. Each insulation heat conducting plate 213 and the insulation heat conducting glue 50 have the features of electrical insulation and heat conduction.

Figure 1:
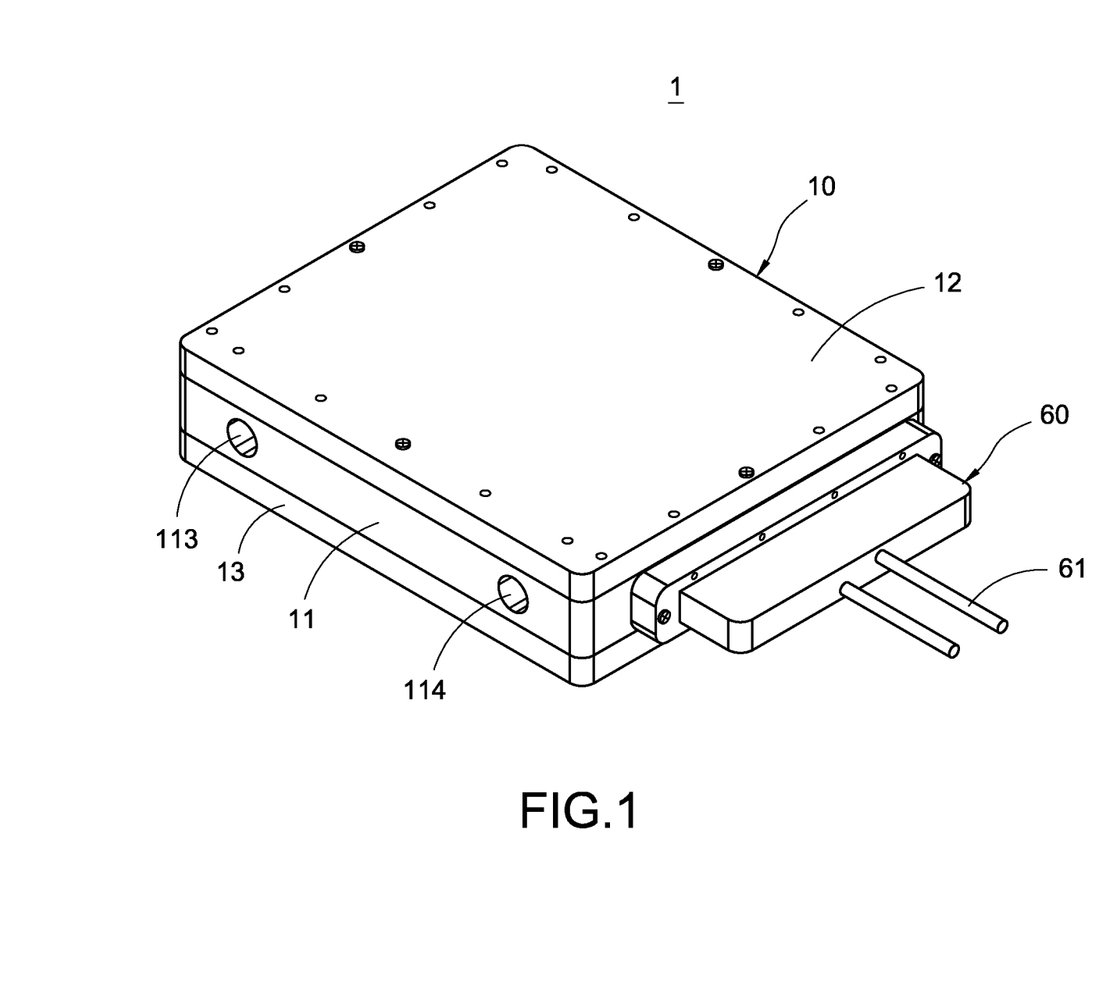
FIG. 1 is an assembled perspective view of the first embodiment according to the present invention.
Figure 2:
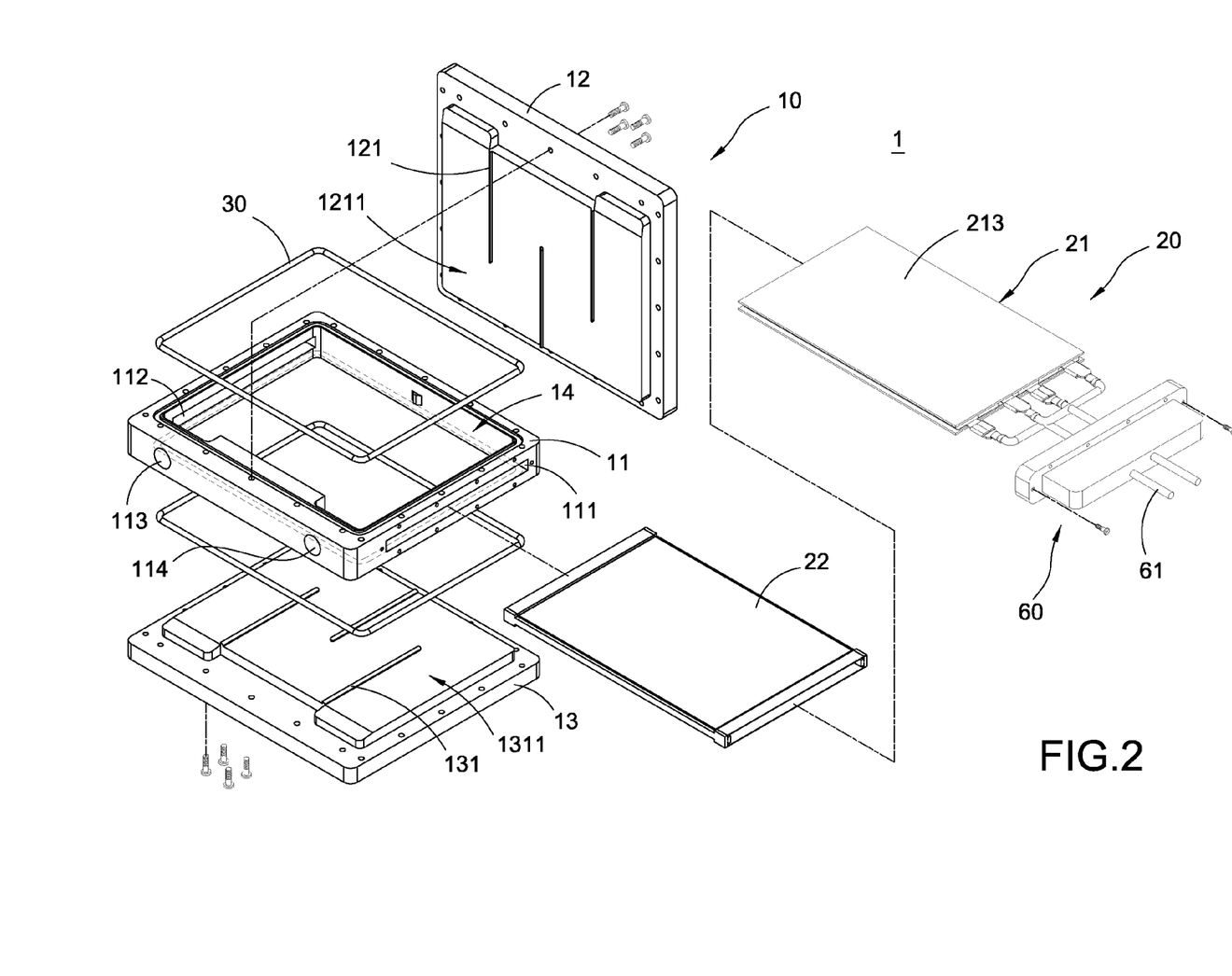
FIG. 2 is an exploded perspective view of the first embodiment according to the present invention.
Figure 3:
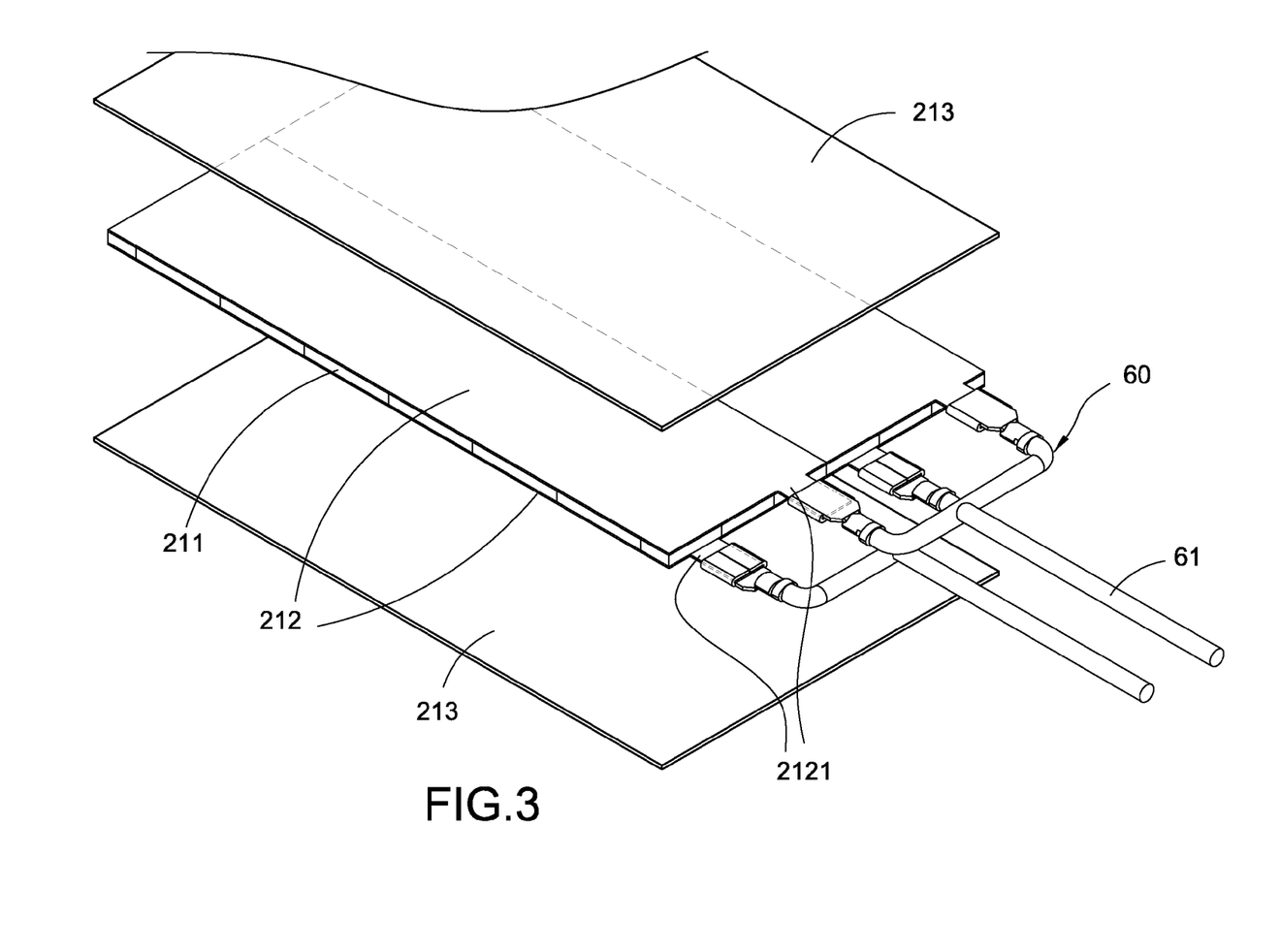
FIG. 3 is an exploded perspective view of the PTC heating component of the first embodiment according to the present invention.
Figure 4:
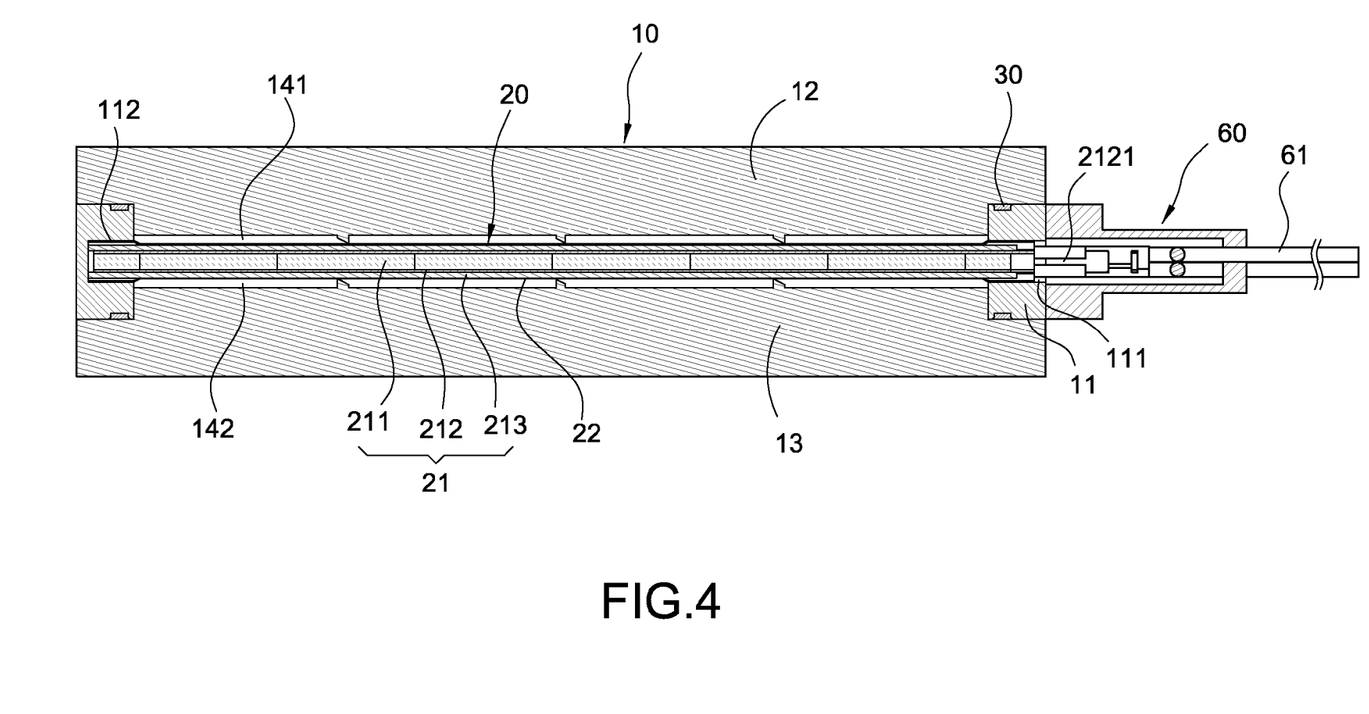
FIG. 4 is a cross-sectional view of the assembled first embodiment according to the present invention.
Figure 5:
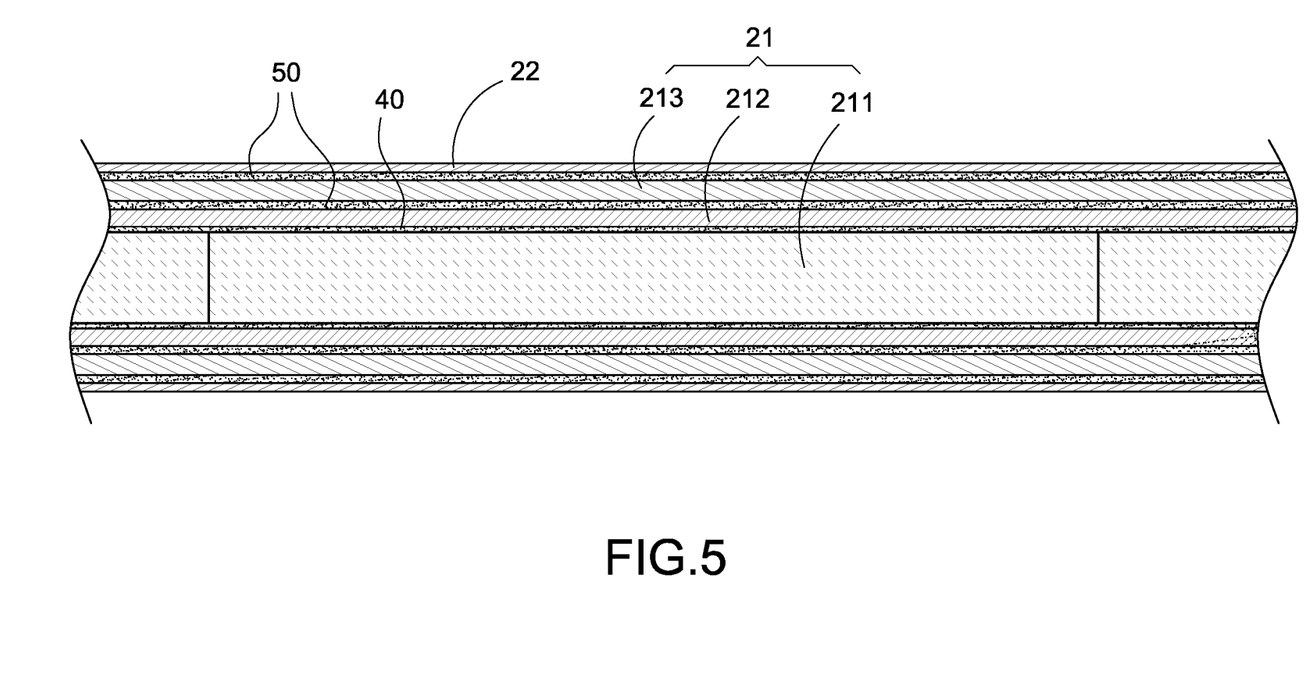
FIG. 5 is a schematic view of the partially magnified heating module of the first embodiment according to the present invention.
Figure 6:
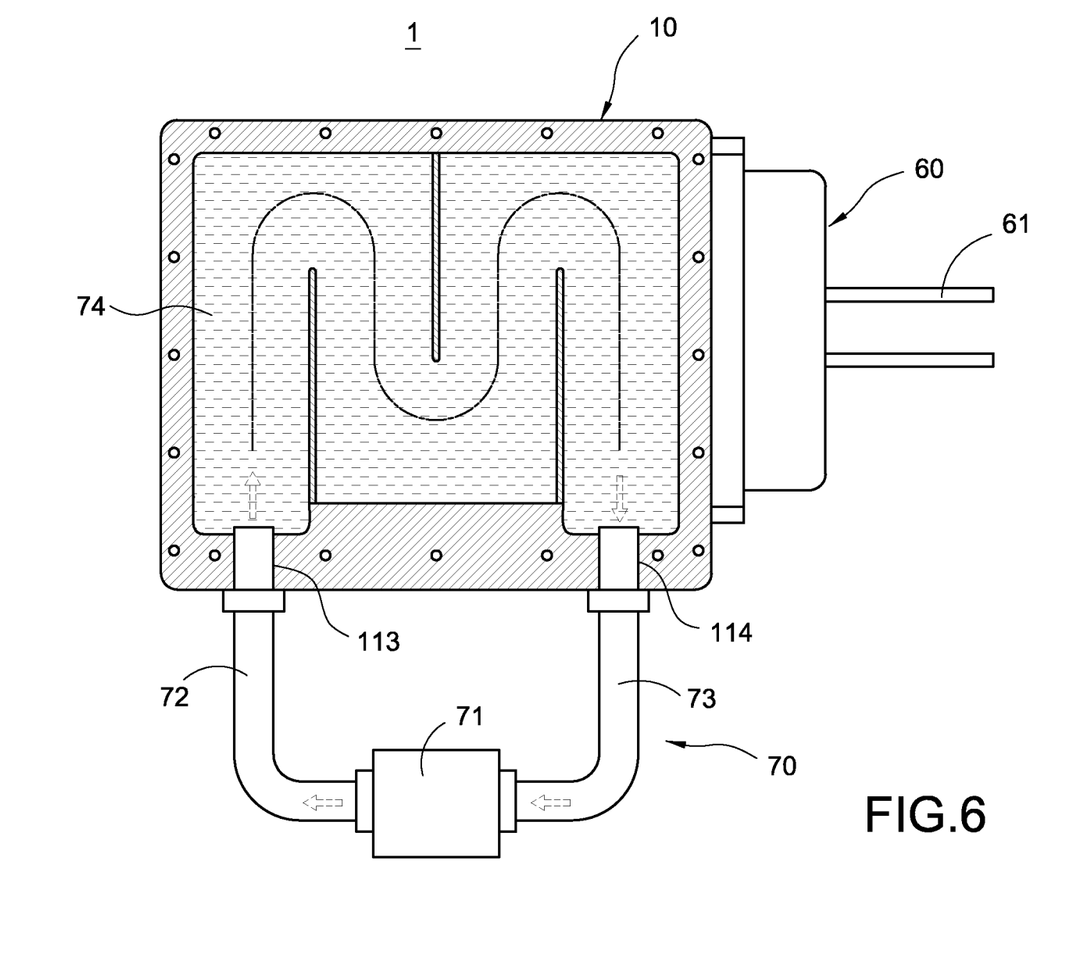
FIG. 6 is a schematic view of the assembled first embodiment according to the present invention.

Please refer to FIG. 6, which is a schematic view of the assembled first embodiment according to the present invention. The electrical heating device and equipment 1 further includes a liquid supply 70. The liquid supply 70 includes a water pump 71, a liquid inlet pipe 72, a liquid outlet pipe 73, and a liquid 74. The liquid inlet pipe 72 communicates with the water pump 71 and the water inlet 113 of the hollow proper 11. The liquid outlet pipe 73 communicates the water pump 71 and the water outlet 114 of the hollow proper 11. The liquid 74 is filled in the first chamber 141 and the second chamber 142 of the box body 10.

When using the electrical heating device and equipment 1 to heat the liquid 74, the power source is connected to the second electric conductive terminal 61 of the connector 60 to provide the electricity to each electrode plate 212, and each electrode plate 212 can further provide the power to the PTC heating unit 211. Since the PTC heating unit 211 has large resistance value, the electricity provided by the electrode plate 212 can be converted to heat, and the heat generated by the PTC heating unit 211 can be conducted to each electrode plate 212, and further conducted from each electrode plate 212 to each insulation heat conducting plate 213. And then, the heat can be conducted from the heat conducting plate 213 to the heat conducting component 22, and the heat conducting component 22 exchanges the heat with the liquid 74 in the first chamber 141 and the second chamber 142 to achieve the goal of heating the liquid 74. Meanwhile, the liquid 74 will flow into the liquid outlet pipe 73 via the water outlet 113 of the hollow proper 11, and further flows into the water pump 71 from the liquid outlet pipe 73. The water pump 71 inputs the liquid 74 to the liquid inlet pipe 72, and the liquid 74 can flow into the first chamber 141 and the second chamber 142 from the water inlet 113 of the hollow proper 11 via the liquid inlet pipe 72, thereby cyclically heating the liquid 74.

Since the heating module 20 is inserted into the hollow proper 11 in a pluggable way, the heating module 20 can be replaced or repaired when the heating module is damaged or not working properly, thereby saving maintenance time and the cost of replacing the electrical heating device and equipment 1.

Besides, since the outer surface of the heat conducting component 22 directly contacts the liquid 74 of the first chamber 141 and the second chamber 142, the heat conducting component 22 can directly heat the liquid 74, and thus improves the heating effect for the liquid 74. Moreover, by utilizing the fluid passages 1211, 1311 formed in the first chamber 141 and the second chamber 142 by each convex rib 121, 131 of the upper cover plate 12 and the lower cover plate 13, respectively, the flowing distance that the liquid 74 flows into or flows out the first chamber 141 and the second chamber 142 can be increased. By doing so, the heating module 20 has more heating time for the liquid 74, and the heating effect for heating the liquid 74 by the electrical heating device and equipment 1 can be improved as well.

Besides, each insulation heat conducting plate 213 having the electrical insulation feature is sandwiched between the inner surface of each electrode plate 212 and the heat conducting component 22 to prevent the electrical leakage from each electrode plate 212 to the heat conducting component 22. The insulation heat conducting plate 213 is heat-conductive, so the heat conduction from each electrode plate 212 to the heat conducting component 22 can be improved. And also, the insulation heat conducting glue 50 is made of a base material added with the high heat-conductive ceramic powder. The base material can be silica gel, plastic or epoxy resin, and the ceramic powder can be alumina, silicon nitride, aluminum nitride or carborundum, and thus the heat conducting effect from each electrode plate 212 to each insulation heat conducting plate 213, or from each insulation heat conducting plate 213 to the heat conducting component 22, can be even improved.

Besides, the heat conducting glue 40 is made of electric conductive and heat conductive material. The heat conducting glue 40 can be made of silica gel, plastic or rubber added with copper or silver material. Thus, the efficiency of conducting electricity from the electrode plate 212 to the PTC heating unit 211 can be improved, thereby enhancing the effect of generating heat by the PTC heating unit 211, and improving the heat conduction from the PTC heating unit 211 to each electrode plate 212 as well.

Figure 7:
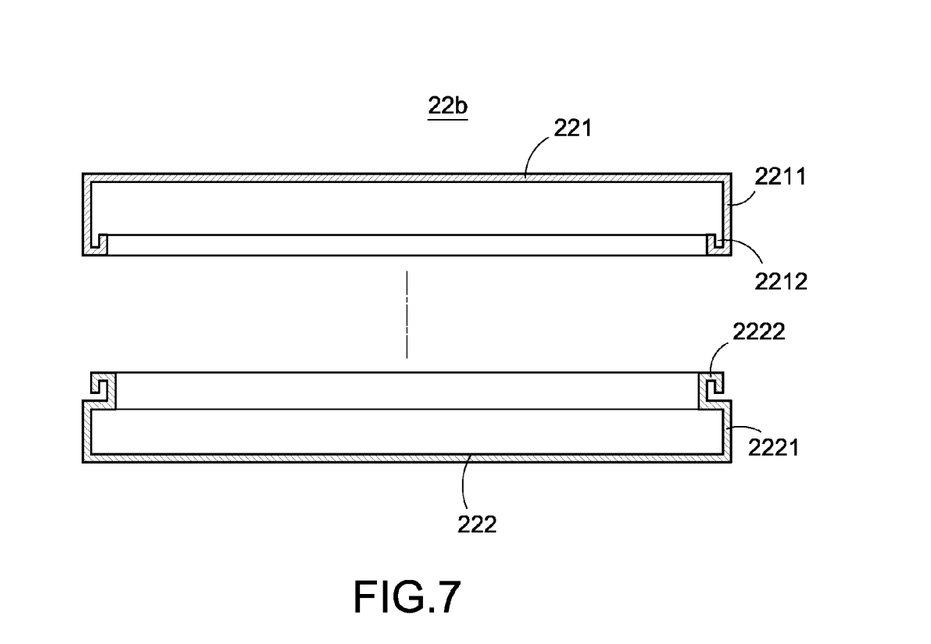
FIG. 7 is a first schematic view of the heat-conducting component of the second embodiment according to the present invention.
Figure 8:
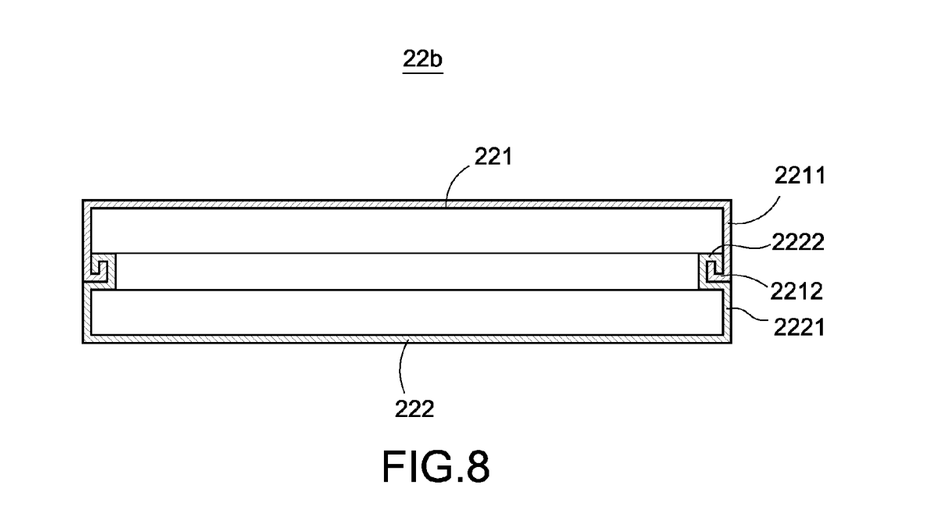
FIG. 8 is a second schematic view of the heat-conducting component of the second embodiment according to the present invention.

Please refer to FIGS. 7 and 8, which are the first and the second schematic view of the heat-conducting component of the second embodiment according to the present invention. The main difference compared to the previous embodiment is that, the heat conducting component 22 is replaced to heat conducting component 22b. The heat conducting component 22b includes an upper case 221 and a lower case 222. One surface of the upper case 221 forms a U-shaped upper standing wall 2211 constructed by three sides, and one surface of the lower case 222 forms a U-shaped lower standing wall 2221 constructed by three sides. Two opposite sides of the upper standing wall 2211 are formed with an upper hook 2212 bending inward, and two opposite sides of the lower standing wall 2221 are formed with a lower hook 2222 bending outward. Each upper case 221 and each lower case 222 buckles each other by each upper hook 2212 and each lower hook 2222.

Figure 9:
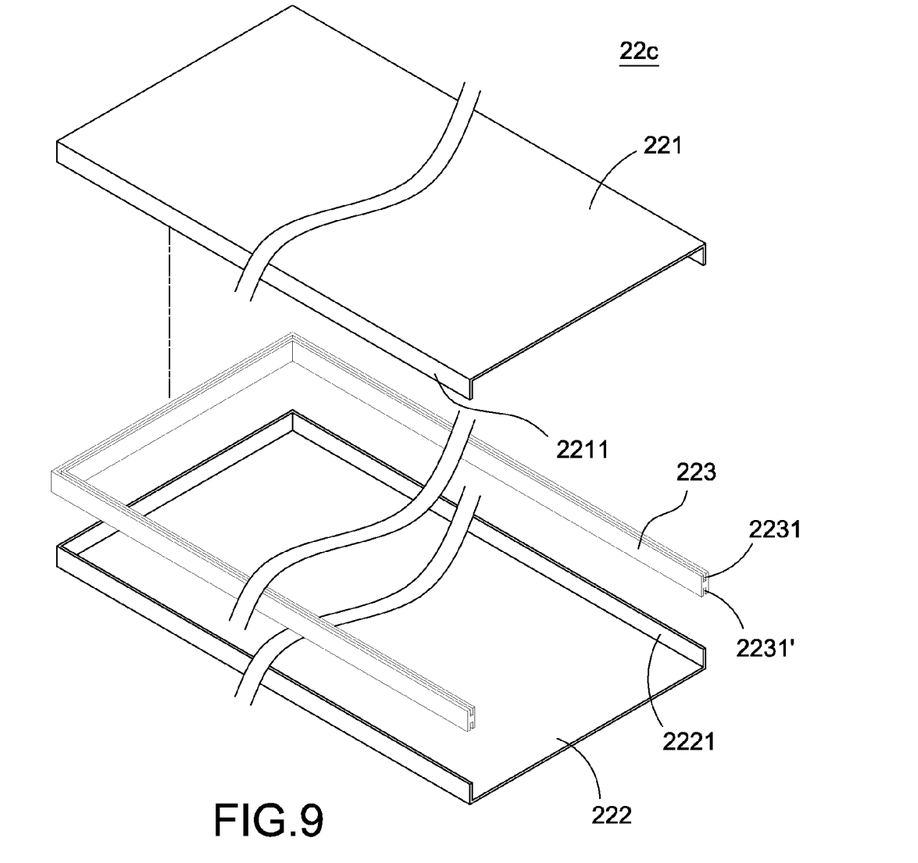
FIG. 9 is a first schematic view of the heat-conducting component of the third embodiment according to the present invention.
Figure 10:
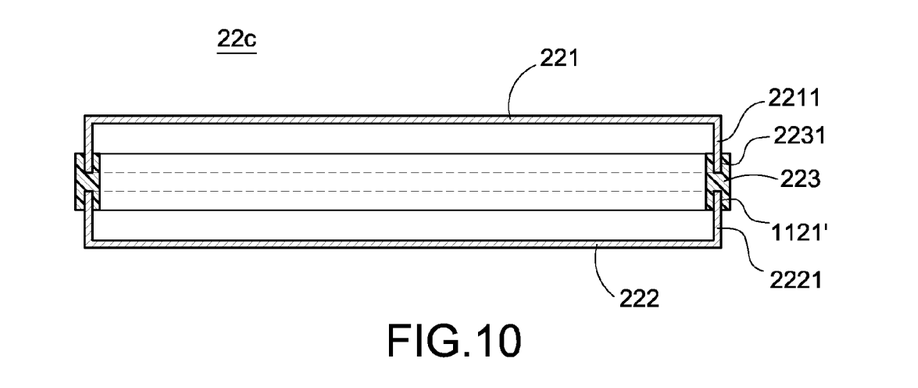
FIG. 10 is a second schematic view of the heat-conducting component of the third embodiment according to the present invention.

Please refer to FIGS. 9 and 10, which are the first and the second schematic view of the heat-conducting component of the third embodiment according to the present invention. The main difference compared to the previous embodiments is that, the heat conducting component 22 is replaced to heat conducting component 22c. The heat conducting component 22c includes an upper case 221, a lower case 222, and a pair of long strip objects 223. One surface of the upper case 221 forms a U-shaped upper standing wall 2211 constructed by three sides, and one surface of the lower case 222 forms a U-shaped lower standing wall 2221 constructed by three sides. The cross section of the long strip object 223 is formed H-shaped cross section which is formed with an upper track and a lower track for the upper standing wall and the lower standing wall slidably engaged therein, respectively. By this arrangement, the upper case 221 can be connected with the lower case 222.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An electrical heating device (1) with pluggable heating module for heating liquid (74), comprising:

a box body (10) having an accommodation space (14) for the liquid (74) contained therein, which is provided with a slot (111) communicating the accommodation space (14); and a heating module (20) received in the slot (111) in a pluggable way and separating the accommodation space (14) into a first chamber (141) and a second chamber (142), the heating module (20) including a positive temperature coefficient (PTC) heating component (21) and a heat conducting component (22) covering outside of the PTC heating component (21), wherein the box body (10) includes a hollow proper (11), an upper cover plate (12) and a lower cover plate (13) covering both sides of the hollow proper (11), respectively; the accommodation space (14) is formed by surrounding with the hollow proper (11), the upper cover plate (12), and the lower cover plate (13); and the slot (111) is provided on one side of the hollow proper (11).

2. The electrical heating device according claim 1, wherein a plurality of convex ribs (121, 131) against an outer surface of the heat conducting component (22) are formed on each side of the upper cover plate (12) and the lower cover plate (13) near the hollow proper (11).

3. The electrical heating device according to claim 1, wherein a waterproof gasket (30) is provided between the upper cover plate (12) and the hollow proper (11), and also between the lower cover plate (13) and the hollow proper (11).

4. The electrical heating device according to claim 1, further comprising an insulation heat conducting glue (50), the PTC heating component (21) being adhered to the heat conducting component (22) via the insulation heat conducting glue (50).

5. The electrical heating device according to claim 4, further comprising a heat conducting glue (40), the PTC heating component (21) including at least one PTC heating unit (211), a pair of electrode plates (212) being adhered to each side of the PTC heating unit (211) via the heat conducting glue (50), and a pair of insulation heat conducting plates (213) being adhered to the pair of the electrode plates (212) via the insulation heat conducting glue (40), respectively.

6. The electrical heating device according to claim 5, further comprising a connector (60) engaged on the slot (111) and covering one end of the PTC heating component (21) near the slot (111), and electrically connecting each of the pair of the electrode plates (212).

7. An electrical heating equipment (1) having pluggable heating module, comprising:

a liquid supply (70) including liquid (74), a pump (71), an inlet pipe (72) and an outlet pipe (73) connecting to the pump (71);

a box body (10) having an accommodation space (14) for contained therein, the box body (10) provided with a slot (111), an inlet (113) and an outlet (114) communicating the accommodation space (14), the inlet (113) connecting with the inlet pipe (71), and the outlet (114) connecting with the outlet pipe (72); and a heating module (20) received in the slot (111) in a pluggable way and separating the accommodation space (14) into a first chamber (141) and a second chamber (142), the inlet (113) and the outlet (114) communicating the first chamber (141) and the second chamber (142), respectively, the heating module (20) including a positive temperature coefficient (PTC) heating component (21) and a heat conducting component (22) covering outside of the PTC heating component (21), wherein the box body (10) includes a hollow proper (11), an upper cover plate (12) and a lower cover plate (13) covering both sides of the hollow proper (11), respectively; the accommodation space (14) is formed by surrounding with the hollow proper (11), the upper cover plate (12), and the lower cover plate (13); the slot (111) is provided on one side of the hollow proper (11); and the inlet (113) and the outlet (114) are provided on another side near the slot (111) of the hollow proper (11).

8. The electrical heating device according to claim 7, a plurality of convex ribs (121, 131) against an outer surface of the heat conducting component (22) are formed on each side of the upper cover plate (12) and the lower cover plate (13) near the hollow proper (11).

9. The electrical heating device according to claim 7, wherein a waterproof gasket (30) is provided between the upper cover plate (12) and the hollow proper (11), and also between the lower cover plate (13) and the hollow proper (11).

10. The electrical heating device according to claim 7, further comprising an insulation heat conducting glue (50), the PTC heating component (21) being adhered to the heat conducting component (22) via the insulation heat conducting glue (50).

11. The electrical heating device according to claim 10, further comprising a heat conducting glue (40), the PTC heating component (21) including at least one PTC heating unit (211), a pair of electrode plates (212) being adhered to each side of the PTC heating unit (211) via the heat conducting glue (50), and a pair of insulation heat conducting plates (213) being adhered to the pair of the electrode plates (212) via the insulation heat conducting glue (40), respectively.

12. The electrical heating device according to claim 11, further comprising a connector (60) engaged on the slot (111) and covering one end of the PTC heating component (21) near the slot (111), and electrically connecting each of the pair of the electrode plates (212).

13. An electrical heating equipment (1) having pluggable heating module, comprising:

a liquid supply (70) including liquid (74), a pump (71), an inlet pipe (72) and an outlet pipe (73) connecting to the pump (71);

a box body (10) having an accommodation space (14) for contained therein, the box body (10) provided with a slot (111), an inlet (113) and an outlet (114) communicating the accommodation space (14), the inlet (113) connecting with the inlet pipe (71), and the outlet (114) connecting with the outlet pipe (72); and a heating module (20) received in the slot (111) in a pluggable way and separating the accommodation space (14) into a first chamber (141) and a second chamber (142), the inlet (113) and the outlet (114) communicating the first chamber (141) and the second chamber (142), respectively, the heating module (20) including a positive temperature coefficient (PTC) heating component (21) and a heat conducting component (22) covering outside of the PTC heating component (21), wherein the heat conducting component (22b, 22c) includes an upper case (221) and a lower case (222), one surface of the upper case (221) is formed a U-shaped upper standing wall (2211) constructed by three sides, one surface of the lower case (222) is formed a U-shaped lower standing wall (2221) constructed by three sides, and the upper standing wall (2211) connects the lower standing wall (2221).

14. The electrical heating device according to claim 13, wherein two opposite sides of the upper standing wall (2211) are formed with an upper hook (2212) bending inward, two opposite sides of the lower standing wall (2221) are formed with a lower hook (2222) bending outward, and each upper hook (2212) and each lower hook (2222) buckles each other.

15. The electrical heating device according to claim 13, wherein the heat conducting component (22c) further includes a strip object (223) having a H-shaped cross section formed with an upper track (2231) and a lower track (2231') for the upper standing wall (2211) and the lower standing wall (2221) slidably engaged therein, respectively.

* * * * *